July 20, 1965  H. C. EHRMANTRAUT ETAL  3,195,346
AUTOMATIC OSMOMETER
Filed Jan. 14, 1963 4 Sheets-Sheet 4
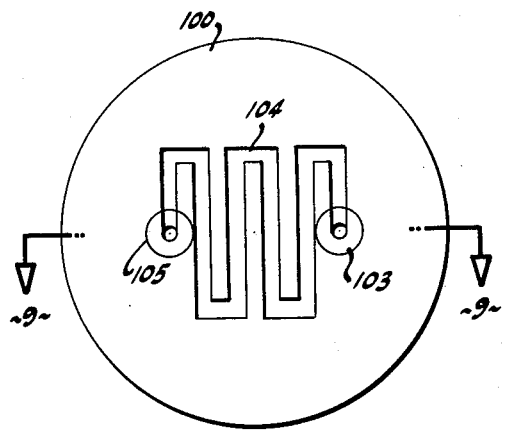
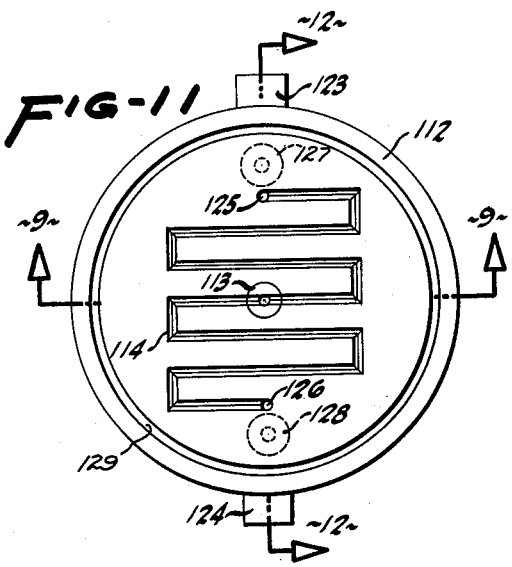
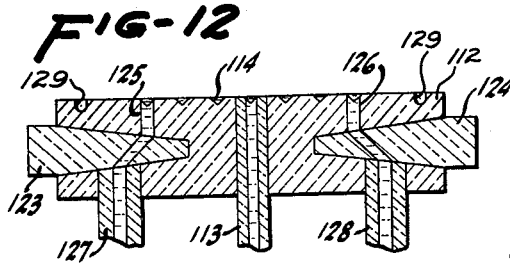
HARRY C. ERHMANTRAUT
RODERIC E. STEELE
WILMER E. WALKER
INVENTORS
BY
Lippincott, Ralls & Hendrickson
ATTORNEYS United States Patent Office 3,195,346
Patented July 20, 1965

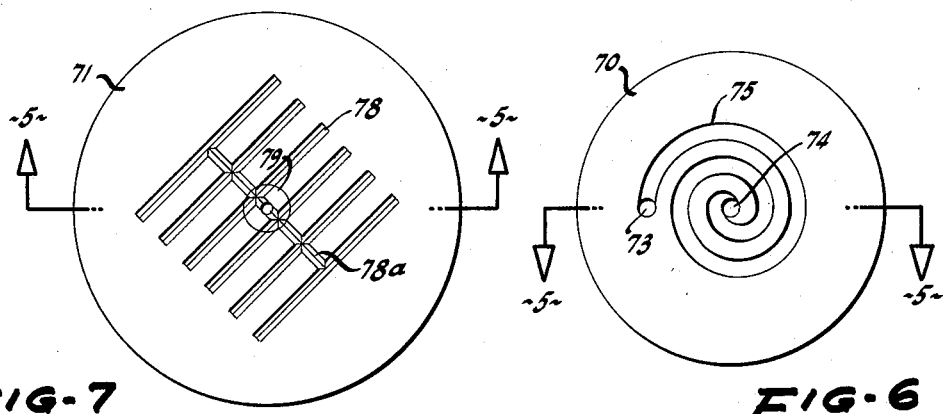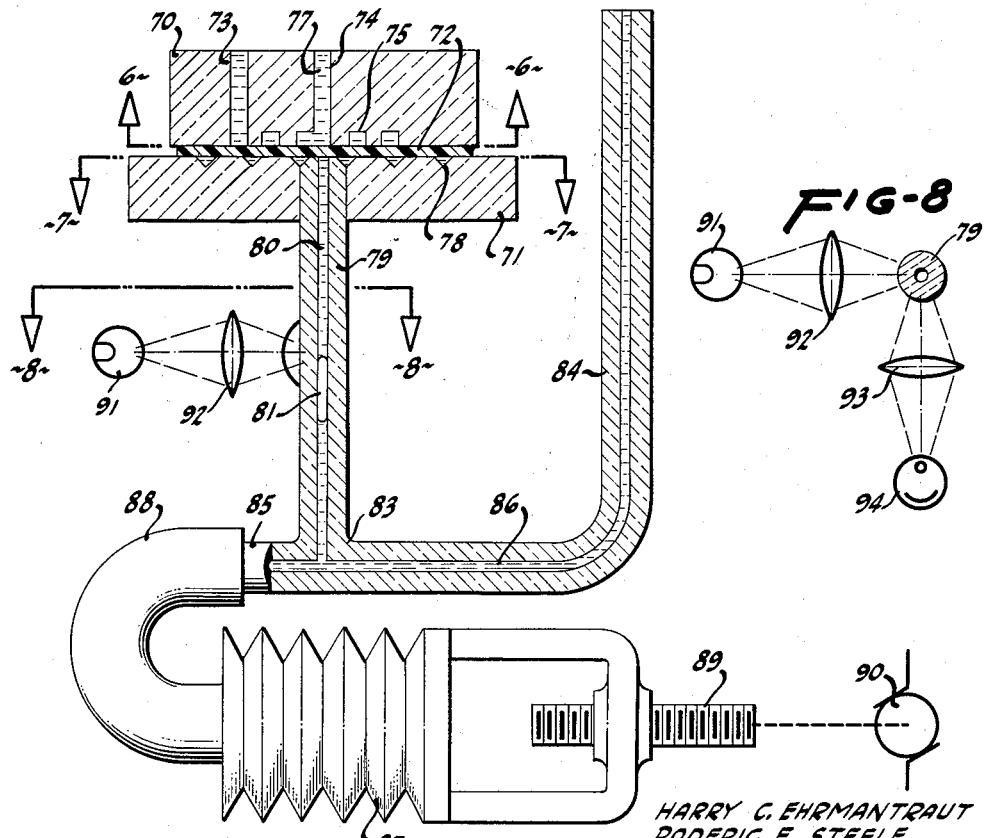

3,195,346
AUTOMATIC OSMOMETER
Harry C. Ehrmantraut, Los Altos, Roderic E. Steele, Portola Valley, and Wilmer E. Walker, Sunnyvale, Calif., assignors, by mesne assignments, to Mechrolab, Inc., a corporation of California
Filed Jan. 14, 1963, Ser. No. 251,259
10 Claims. (Cl. 73—53)

This invention relates to a new and improved osmometer capable of making rapid measurement of osmotic pressure.

Previous, conventional osmometers have been limited in speed, sometimes requiring days or even weeks to reach a pressure equilibrium, and have been limited in accuracy because of loss of a portion of the sample during the long equilibrium time. Displacement of the osmotic membrane and other causes have also contributed to the inaccuracies, and many osmometers have been so pressure-sensitive or temperature-sensitive that extremely elaborate pressure or temperature stabilization mechanisms are required.

There is a further practical difficulty, in that it is extremely troublesome to obtain high-quality membranes. Even the best-grade commercial products yield only a small percentage of membranes suitable for highly accurate work. In addition to the expense involved in purchasing more membranes than are usable, a vast amount of time is consumed in selecting and testing membranes; and removal of a membrane for washing usually renders it unfit for subsequent use. Thus, it becomes extremely important that, once a membrane is selected, it may be retained and re-used.

One object of this invention is to provide an improved osmometer in which rapid readings are obtained by a rapid balancing of the osmotic pressure therein, with negligible flow of fluid through the membrane, whereby portions of the sample are not lost or diluted during the equilibrium time.

Another object of the present invention is to provide an improved osmometer with a rigidly clamped semipermeable membrane, which is held in place more effectively than has been done heretofore, whereby inaccuracies caused by membrane displacement are essentially eliminated.

Still another object is to provide an osmometer that is relatively insensitive to temperature variations, whereby simple, thermostatic temperature stabilization is adequate, and the very elaborate and costly temperature stabilization systems, heretofore required for the most accurate work, are avoided.

A further object of this invention is to provide an improved osmometer, so constructed that the membrane, used therein, may be washed and re-used without removal from the osmometer or disturbance of the membrane itself.

As well as eliminating the above-mentioned deficiencies of prior-art osmometers, the present invention eliminates the need for inaccurate and time-consuming extrapolation techniques, and the difficulties inherent in prior flow-measurement techniques. The present invention rapidly, accurately and automatically balances the osmotic pressure across the semipermeable membrane with an equal and opposite pressure, responsive to a negligible fluid flow through the membrane, allowing rapid measurement of the quantities desired.

Briefly, one feature of this invention is the provision of a block and a clamp, between which the membrane is so firmly held that appreciable movement of the membrane is impossible. The slightest movement of the membrane should be avoided because it has the same effect, with respect to the pressure-balancing and measuring apparatus, as a flow of fluid through the membrane. The block has a generally flat surface on which the membrane rests, inscribed to form one or more narrow, shallow channels which hold solvent in contact with the membrane. The clamp has a generally flat lower face, which is pressed down forcefully on top of the membrane, inscribed to form one or more narrow, shallow, continuous channels, which hold the sample solution in contact with the membrane. The channels in the clamp may have various arrangements relative to the channels in the block. A preferred arrangement uses an alignment of the two sets of channels. Such an orientation eliminates crossover points between the channels in the block and the channels in the clamp. These crossover points sometimes cause pockets to form in the membrane which then trap some of the sample and/or solvent. A proper selection of membrane material, strength, and channel width will also combat the tendency to form these pockets.

A serpentine arrangement of channels is preferred. This arrangement insures that a relatively large area of the membrane is subjected to both the solvent and the sample solution, thus providing more rapid build-up of osmotic pressure and more rapid attainment of pressure equilibrium. At the same time, ample spaces remain between channels, rigidly holding the membrane in place both above and below, leaving no appreciable span unsupported.

Another feature is the connection of the narrow, shallow channels in the block, which contain the solvent, to a capillary wherein the position of a meniscus between the solvent and an air bubble changes upon the slightest flow of fluid through the membrane. A photoelectric system, responsive to a difference in the light-scattered to light-transmitted ratio between the solvent-filled portion and the air-filled portion of the capillary, monitors the position of the meniscus and controls the pressure-balancing apparatus to prevent any appreciable flow of fluid through the membrane. Thus, a very rapid attainment of pressure equilibrium is assured. Furthermore, the total volume of solvent between the membrane and the meniscus is minute; hence, the changes in volume caused by expansion or contraction with temperature changes are correspondingly small. Therefore, temperature stability requirements in this osmometer are less severe than in prior osmometers requiring larger volumes of fluid. Because changes in volume caused by expansion or contraction of the fluid cause a flow of fluid through the membrane, this fluid must be allowed to return before accurate measurement can be made. A delay thus occurs in the attainment of pressure equilibrium. The volume reductions made possible by this invention are therefore very significant.

Still another feature is the provision of fluid passageways connected to opposite ends of the sample-containing channel in the clamp. Fluid may be introduced through one of these passageways, flow through the channel in contact with the membrane, and out the other passageway, thus flushing out the sample-containing channel and introducing a new sample solution without removing or in any manner distrubing the membrane. If desired, similar provisions may be made for introducing fresh solvent (in case of contamination) into the solvent-containing channel in contact with the membrane. Thus the same membrane may be used for many measurements.

Other objects, features and advantages of this invention will become apparent from the following description and the accompanying drawings.

FIG. 1 is a schematic vertical section of an osmometer embodying the present invention.
FIG. 2 is a section taken along line 2—2 of FIG. 1.
FIG. 3 is a section taken along line 3—3 of FIG. 1.
FIG. 4 is a section of the same osmometer showing assembly of the sample-and solvent-containing cell in its temperature-stabilized housing.

FIG. 5 is a schematic vertical section of a second embodiment of this invention.

FIG. 6 is a section taken along line 6—6 of FIG. 5.

FIG. 7 is a section taken along line 7—7 of FIG. 5.

FIG. 8 is a section taken along line 8—8 of FIG. 5.

FIG. 9 is a schematic vertical section of a third embodiment of this invention.

FIG. 10 is a section taken along line 10—10 of FIG. 9.

FIG. 11 is a section taken along line 11—11 of FIG. 9.

FIG. 12 is a section taken along line 12—12 of FIG. 11.

Figure 1:
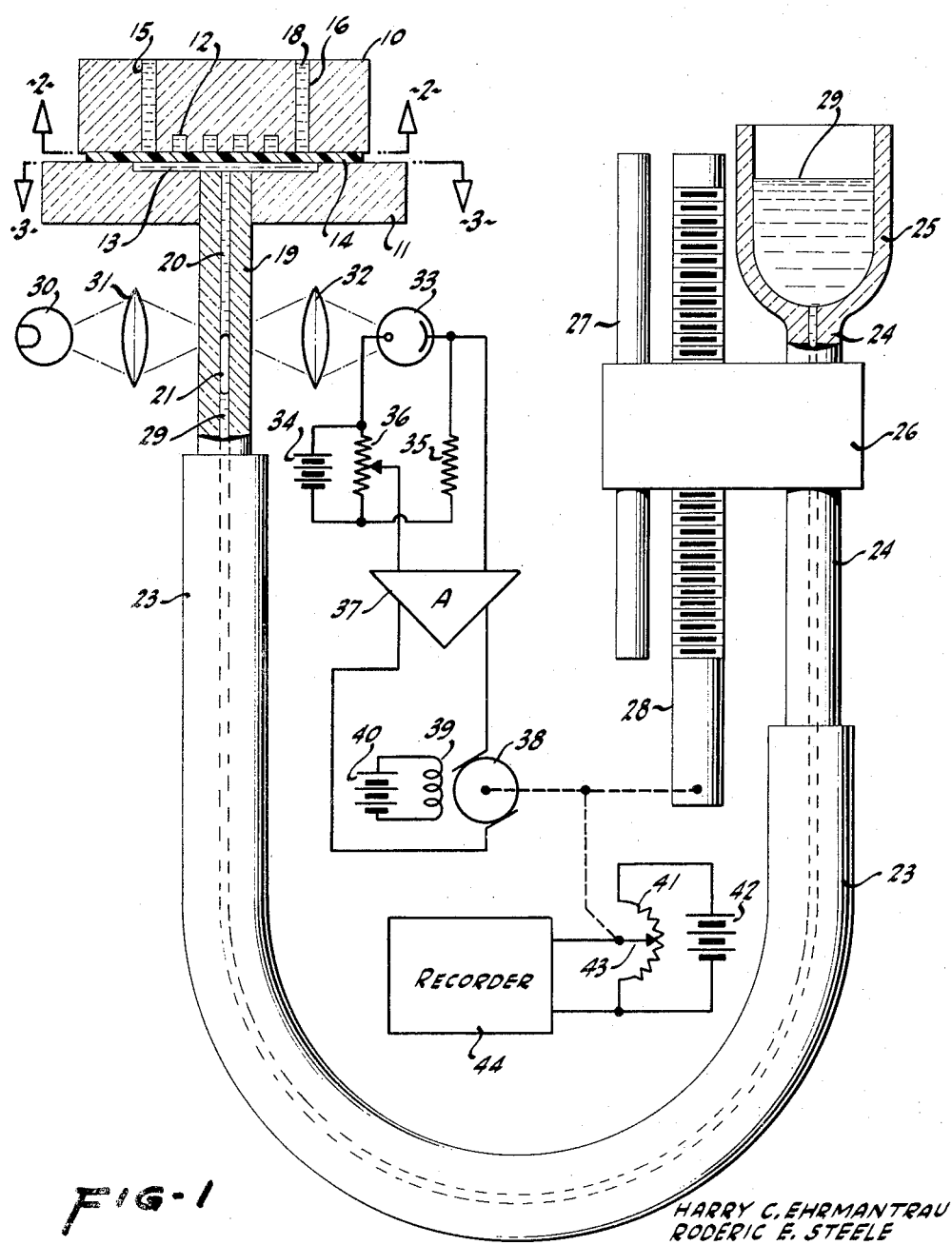

Referring to FIGS. 1–4, one embodiment of the present invention comprises a sample-containing, membrane-holding clamp 10 held in place over a solvent-containing, membrane-supporting block 11 in a manner hereinafter described. The adjacent surfaces of clamp 10 and block 11 are generally flat, and have narrow, shallow channels 12 and 13 inscribed therein to form spaces to be filled with a sample solution and a solvent, respectively. Parts 10 and 11 are fitted together in a face-to-face relationship with a semipermeable membrane 14 tightly clamped between them. This membrane provides a boundary between the sample-containing and solvent-containing spaces defined by channels 12 and 13. The membrane-holding clamp 10 is provided with columnar holes 15 and 16 which communicate with opposite ends of channel 12, completing the sample chamber which receives and holds the sample solution 18 to be tested.

Capillary tube 19, containing a liquid solvent 20 and a bubble 21 extends centrally through membrane support block 11 and is in communication with channel 13, so that the portion of capillary tube 19 above bubble 21 and the space within channels 13 form a solvent chamber. Bubble 21 may be air, or any fluid that does not mix with the solvent 20. The other end of capillary tube 19 is connected through a flexible tube 23 and capillary stem 24 to a vertically movable, open cup 25, forming a device similar to a manometer. A supporting arm 26, mounted for vertical movement along a rod or track 27, moves cup 25 up or down upon the turning of screw 28. A liquid 29, usually the same as solvent 20, fills the portion of capillary 19 beneath bubble 21, the flexible tubing 23, stem 24, and a portion of cup 25.

Upon the slightest flow of fluid through membrane 14, the upper meniscus of bubble 21 starts to move. This movement is detected photoelectrically by taking advantage of the fact that the air bubble, within the glass capillary, scatters a larger percentage of light directed onto it than will the liquid-filled portion of the capillary, because there is a greater difference between the refractive indexes of the glass and the air than there is between the refractive indexes of the glass and liquid solvent. A narrow beam of light from lamp 30 is focused by lens 31 on the upper meniscus of bubble 21, so that some of the light rays are projected into bubble 21 and thereby are scattered to a relatively great extent, while others of the light rays go through solvent 20 and are transmitted with relatively little scattering through lens 32 into photocell 33, which is connected in a conventional bridge circuit comprising a voltage source 34, a resistor 35, and potentiometer 36, connected as shown. Responsive to a minute movement of the meniscus between solvent 20 and bubble 21, the photocell provides an electric signal through amplifier 37 to a reversible servomotor, illustrated as a D.-C. motor having an armature 38 and a field winding 39 constantly energized by a D.-C. supply 40. The servomotor is connected to turn screw 28 in the proper direction to raise or lower cup 25, as required, to oppose movement of the upper meniscus of bubble 21 by adjusting the fluid pressure applied to the lower meniscus of the bubble. Thus, movements of the meniscus are limited to microscopic distances, and a pressure balance is achieved without an appreciable flow of fluid through the membrane. When a pressure balance is obtained, at which the net flow of fluid through the membrane 14 is zero, the pressure applied to the bottom surface of the membrane plus the upward osmotic pressure must be equal to the pressure applied to the top surface of the membrane. The pressure on the top surface is equal to atmospheric pressure plus pressure head of the sample solution 18. The pressure on the bottom surface is atmospheric pressure plus the pressure head due to the elevation of the liquid surface in cup 25 above the level of the membrane, or less the pressure head due to the depression of the liquid surface in cup 25 below the level of the membrane. In either case, correction is made for the length of the bubble. Atmospheric pressure, appearing on both sides of the balanced equation, cancels out, and may be disregarded; in effect, then, the desired pressure balance may be obtained by making the pressure head of the sample equal to the pressure head due to the elevation of the liquid surface plus the osmotic pressure. The depth of the sample being equal to the thickness of clamp 10, and constant, the pressure head of the sample varies only as the density (of the sample). Furthermore, the large inside diameter of cup 25, relative to other fluid-containing parts of the system, insures that there will be no appreciable change in the liquid level inside the cup relative to the cup itself, so long as no liquid is added to or withdrawn from the system. Hence, once the apparatus is calibrated, osmotic pressure can be measured to a high degree of accuracy simply by measuring the vertical displacement of cup 25 required to achieve a pressure balance that holds the upper meniscus of the bubble 21 in place. An electric signal proportional to this displacement is readily provided by a potentiometer 41, supplied with a constant voltage by voltage source 42, coupled to motor 38 through appropriate gears so that the position of the potentiometer tap 43 is adjusted as screw 28 is rotated. This electric signal can be supplied to a conventional chart recorder 44 to make a permanent record of the osmotic pressure measured. Also, a digital counter readout may be connected to screw 28 through suitable gearing to indicate the head of pressure directly.

Figures 2, 3:
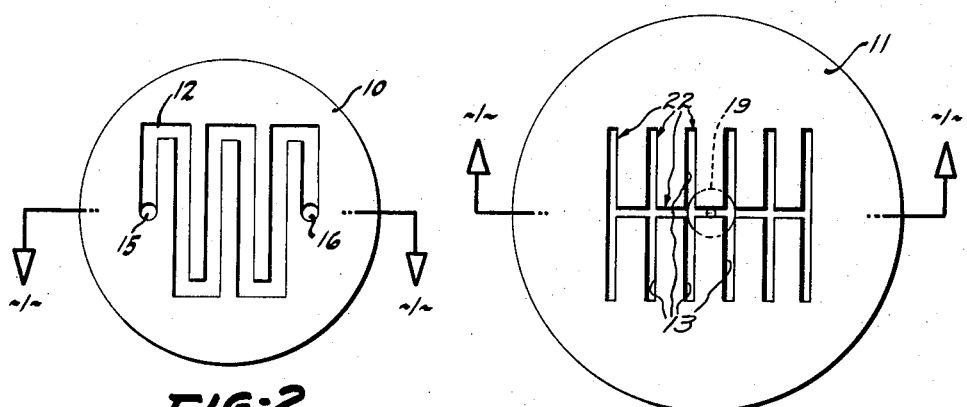

Referring to FIGS. 2 and 3, the structure of the solution chamber in clamp 10, and the solvent chamber in block 11 is shown in greater detail. In FIG. 2 it will be seen that the vertical columnar holes 15 and 16 intersect serpentine channel 12, which is in the order of 10 to 50 mils deep, at opposite ends of said channel, forming a continuous sample chamber in clamp 10. This sample chamber is small in volume, enabling the use of minute amounts of sample (0.5 cc. of blood, for example). A sample solution which is to be tested may be inserted into column 15 by convenient means, as from a dropper. Sample will flow from the top of column 15 through channel 12 to the top of column 16. The pressure head of the sample on the membrane is fixed by the thickness of the clamp and the density of the sample. A new sample may be inserted without removing the membrane or disassembling the apparatus in any way. To accomplish this, solvent 20 may be flushed through the sample chamber by introducing the solvent throught hole 15, rinsing out the residue of the previous sample and cleaning the membrane. A new sample may then be inserted and a second reading obtained.

In FIG. 3 it may be seen that the solvent-containing, membrane-supporting block 11 is provided with a plurality of parallel channels 13, preferably about 5 mils deep, extending outwardly from a single common intersecting channel. Referring to FIGS. 1 and 3, the volume above bubble 21 in capillary tube 19 and the volume of the radial grooves 13 beneath semipermeable membrane 14 defines the solvent chamber occupied by a solvent 20. Because the volume of the solvent chamber 22 is small, minute quantities of solvent 20 are used therein. The change in volume of the solvent due to temperature changes is negligible; consequently the temperature stability requirement of this invention is not as severe as with other osmometers requiring large-volume solvent chambers. Because of this feature, this invention provides a decided advantage over prior types, in that excessive, expensive, bulky temperature-stability equipment is not required; even more important, expansion or contraction of solvent is equivalent to the flow of solvent under an increase or decrease in osmotic pressure, and therefore the waiting time for equilibrium to obtain again is eliminated, and the reading is not delayed.

Still referring to FIGS. 1, 2, and 3, clamp 10 and block 11 are clamped together with semipermeable membrane 14 between them. The serpentine grooves in clamp 10 (FIG. 2) and the parallel channels in block 11 (FIG. 3) are so aligned that the sample and the solvent chambers are in communication with each other over most of the length of the chambers across semipermeable membrane 14. Communication is provided anywhere on the membrane where the flat surfaces of both clamp and block do not coincide. This arrangement provides adequate area for transportation of the solvent 20 across the membrane plane; yet the unchanneled surface area is still large enough to provide more than adequate reinforcement of membrane 14, preventing stretching of said membrane 14 by osmotic pressure or by volume changes due to temperature difference existing between sample 18 and solvent 20. Thus, a large source of error heretofore present in conventional osmometers, namely membrane distortion, is eliminated in this osmometer. In addition, membrane fatigue caused by constant stretching of membrane 14 due to osmotic pressure changes is negligible in this invention, providing longer membrane life; and pressure difference between sample and solvent chambers will be more accurately measurable because the membrane is held rigidly in place by clamp 10 and membrane support block 11 without the need for removal, thereby preventing membrane 14 from adjusting to any pressure differential by stretching.

Referring again to FIG. 1, the operation of the present invention may be seen to take place as follows: first, with clamp 10 and semipermeable membrane 14 removed from the top of block 11, cup 25 is positioned so that the level of liquid 29 is slightly below plane 3—3, representing the top of block 11. Solvent 20 may then be poured into the channels 13 until the level of liquid 29 reaches plane 3—3 and the interface of the meniscus between solvent 20 and bubble 21 is in line with the lens and light detecting system 20, 31, 32, and 33. Next, semipermeable membrane 14 is laid flat against the top of membrane support block 11. Clamp 10 is placed on top of membrane 14 and secured in a manner hereinafter described. The membrane 14 is somewhat larger than the planar dimensions of channels 12 and 13 across the face of clamp 10 or block 11, so that the membrane is engaged throughout substantially its entire area and held firmly against displacement even under varying temperature or pressure conditions.

Solvent 20 is then injected into column 15 until it overflows into column 16, so that the sample chamber and solvent chamber are filled with solvent, and the automatic balancing apparatus is operated to achieve a pressure balance across the membrane by raising cup 25 until the liquid surface therein is approximately level with the top of clamp 10. The fluid on both sides of the membrane being the same, the osmotic pressure may be taken to be zero, and recorder 44 may be adjusted to reflect this fact by providing a zero reading. The solvent is removed from the sample chamber, for example, with an ordinary dropper, and the sample 18 is then introduced into column 15 until it overflows at column 16. The resulting osmotic pressure tends to cause an upward flow of solvent 20 through the semipermeable membrane 14, causing bubble 21 to rise. However, a microscopic rise of the upper meniscus of the bubble changes the ratio of scattered light to transmitted light, whereby less light is transmitted through solvent 20 in capillary tube 19 to photocell 33, and an electric signal supplied through amplifier 37 operates the servomotor to turn screw 28, in the proper direction to lower cup 25, thus depressing the level of fluid 29 and providing a hydrostatic pressure head opposing the osmotic pressure. This will quickly balance the pressures and stop the flow of fluid through membrane 14. Thus, equilibrium conditions are achieved with only a microscopic movement of bubble 21 in capillary 19; hence, there is no appreciable flow of fluid through membrane 14, thereby avoiding the long transition period required for conventional osmometers to reach equilibrium. The osmotic pressure is immediately recorded on a graph by recorder 44, or may be read from a conventional counter read-out.

Figure 4:
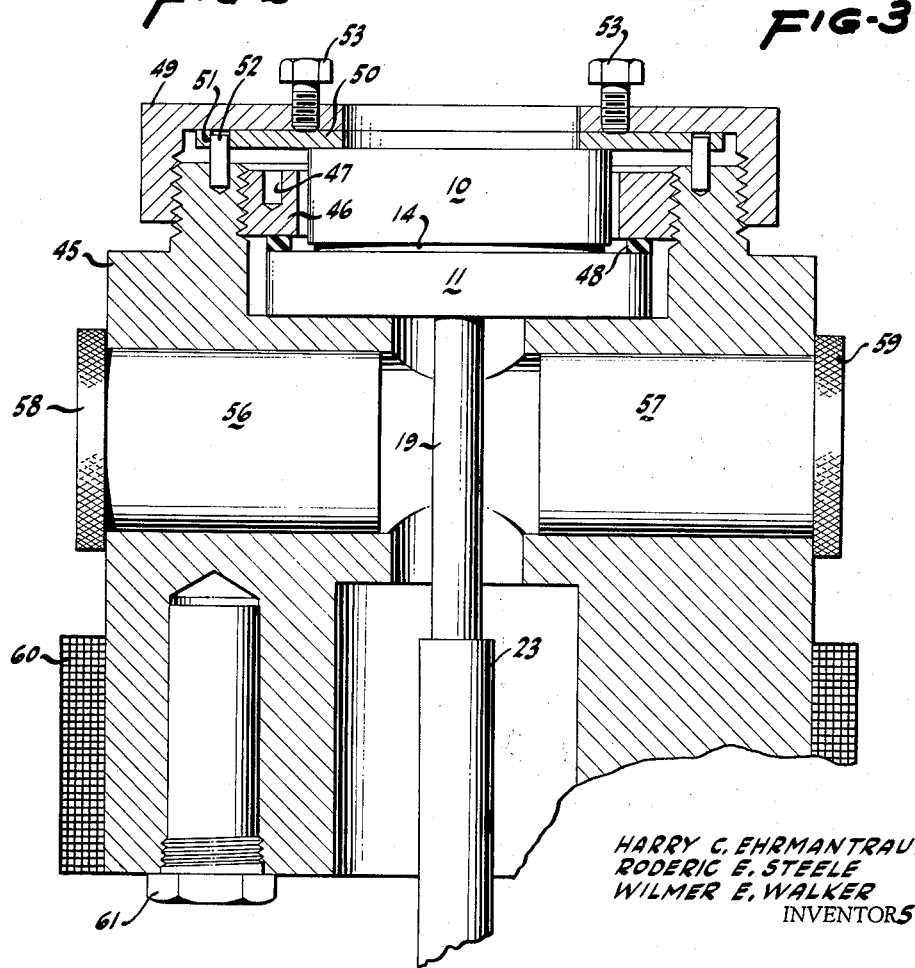

Referring now to FIG. 4, the sample and solvent chambers are housed in a relatively massive, generally cylindrical metal block 45 having a large heat-capacity for maintaining an even temperature. Clamp 10, semipermeable membrane 14, support block 11, and capillary tube 19 are placed within the housing assembly, as shown. Block 11 is held in place by an externally threaded ring 46, which screws into an internally threaded recess in the top of housing 45, as shown. Holes 47 are provided to receive a wrench for turning ring 46. A resilient gasket or washer 48 fits between ring 46 and the top of block 11.

A metal cap 49, internally threaded as shown, screws onto the top of housing 45 to hold clamp 10 in place. To prevent displacement of clamp 10 by turning of screw-cap 49, a metal washer 50 is provided. Holes in this washer receive pins 52 extending up from the top of housing 45, and prevent the rotation of washer 50 when cap 49 is turned. After cap 49 is screwed down tightly, further pressure is applied to clamp 10 by tightening bolts 53, which extend through threaded holes in the top of cap 49 and abut on the upper surface of washer 50. Thus, considerable pressure may be applied to clamp 10 to hold membrane 14 tightly in place between the bottom surface of clamp 10 and the upper surface of block 11.

Cap 49 and washer 50 have concentric central opening, providing access to the holes 15 and 16 of clamp 10. Hence, samples may be injected, or the sample chamber flushed and cleaned, whenever desired, without disassembling any part of the apparatus.

Concentric with the vertical axis of housing 45 is a cylindrical hole wherein capillary tube 19 is inserted. This vertical hole is intersected by transverse holes which receive two cylindrical housings 56 and 57. Housing 56 contains the lamp 30 and lens 31 (FIG. 1) for directing a small beam of light into capillary 19 and housing 57 contains the lens 32 and photocell 33 which receive the transmitted light. Caps 58 and 59 attached to housings 56 and 57 facilitate their removal and replacement.

Housing 45 is kept at a constant temperature by means of an electric heating coil 60, wound about its lower portion, controlled by a thermostat 61 fitted in a hole bored into the bottom of the housing. This serves to keep the temperature very constant, to within a few hundredths of a degree centigrade or better, and the large heat capacity of block 45 prevents rapid temperature changes. Because of the small volume of solvent between membrane 14 and bubble 21, this simple temperature control is adequate for high-precision work, and elaborately controlled, constant-temperature baths are avoided. Instead of, or in addition to, the heating coil 60, the entire housing 45 may be surrounded by insulation, such as foam. Housings 56 and 57 extend through this foam.

Thus, the present invention provides an osmometer which gives rapid readings by quick balancing of the pressures involved therein without any appreciable solvent flow through the membrance, thereby providing decreased reading times and eliminating the danger of loss or dilution of sample during the long equilibrium periods heretofore involved; which is capable of handling small samples, as, for example, one-half cc. or less; which incorporates effective means for holding the membrane in a fixed position against any movement, thereby eliminating measurement inaccuracy due to membrane fluctuation; which provides means for rinsing out the sample chamber so that the same membrane may be re-used for a relatively long period; and which has a very small volume of liquid in the measuring part of the apparatus so that there is a minimum temperature effect.

Referring to FIGS. 5 through 8, a second embodiment of the invention comprises a sample-containing and membrane-holding clamp 70 held in place over a solvent-containing and membrane-supporting block 71 in the manner above described, with semipermeable membrane 72 placed between clamp 70 and block 71. Clamp 70 is provided with two columnar holes 73 and 74, extending through said clamp 70 to the undersurface thereof, and intersecting opposite ends of a spiral channel 75. The volume defined by holes 73 and 74, channel 75, and semipermeable membrane 72 comprises a sample chamber which is filled with a sample 77 to be tested. Sample 77 may be inserted at either column 73 or 74 until overflow occurs at the other column.

Block 71 is provided with a channel 78 and a capillary tube 79, which extends through the underside of block 71 and connects with channel 78 to form a solvent chamber. This solvent chamber is filled with solvent 80, which extends down through the capillary to a bubble 81. Capillary tube 79 connects, through an inverted T joint 83, with tubular arms 84 and 85. Arm 84 extends upward above the level of clamp 82 and is open to the atmosphere, forming a device similar to an open end manometer. Arm 85 is connected to a bellows 87 through a flexible tube 88. Bellows 87 is expanded or contracted, as hereinafter described, by turning a screw 89 mechanically linked to a servomotor 90.

A beam of light emitted from light source 91 and focused by lens 92 is directed onto the meniscus between bubble 81 and solvent 80. A lens 93, placed at a right angle to this beam and capillary 79 (best shown in FIG. 8) will focus the scattered light onto a photocell 94, which is connected, as above described with reference to FIG. 1, to contact a servomotor 90. In this case, the photoelectric system responds to the scattered light, transmitting signals to servomotor 90 which will supply the mechanical motion necessary to turn screw 89 compressing or expanding bellows 87, as the case may require. When bellows 87 is compressed, liquid is forced out of the bellows into manometer arm 84, raising the liquid level in arm 84, and increasing the hydrostatic pressure applied to the bottom of membrane 72. Thus, compressing bellows 87 of FIG. 5 is equivalent to raising cup 25 of FIG. 1. Conversely, expanding bellows 87 is equivalent to lowering cup 25. Since upward movement of bubble 81 increases the amount of light scattered to photocell 94, the servo system must be arranged to expand bellows 87 responsive to such an increase in scattered light, to prevent appreciable movement of the meniscus.

Referring to FIGS. 6 and 7, the sample-containing clamp 70 and membrane-supporting block 71 may be seen in greater detail. In FIG. 6, columnar holes 73 and 74 in clamp 70 are connected to a spiral-shaped channel 75, in the order of 10 to 15 mils deep, at the outer extremity of, and at the center of said spiral, respectively, thus forming a continuous sample chamber capable of receiving minute, accurately-measurable amounts of sample.

In FIG. 7, it will be seen that the channels 78 of membrane-supporting block 71 are a grid-like system of parallel channels 78 intersected by a single bisecting, perpendicular channel 78A, with capillary tube 79 connected thereto. These channels 78 and 78A are in the order of 5 mils deep, and the volume defined by their boundaries with semipermeable membrane 72 and by the portion of capillary tube 79 above the upper meniscus of bubble 81 (FIG. 5) defines the solvent chamber.

When clamp 70 and block 71 are secured together in a face-to-face relationship, with the semipermeable membrane 72 between, these channels will intersect each other frequently, providing sufficient area both for osmotic transportation of the solvent between channels 75 and 78 and for rigid membrane support. It is to be noted in FIGS. 6 and 7 that the channels in clamp 70 and support block 71, when secured together in a face-to-face relationship, form a pattern of intersecting lines which are preferably disposed at an average angle of approximately 45° to each other, so that misalignment between clamp 70 and block 71 will not affect communication between channels 75 and 78. On the other hand, the different configurations presented by channels 75 and 78, together with the angular displacement, limits the area of direct communication so that most of the area of the semipermeable membrane 72 is rigidly supported by the planar surfaces both of clamp 70 and block 71, and is held firmly against movement; yet at the same time sufficient area for transportation of solvent across the flat plane of membrane 72 is provided where the planar surfaces do not coincide.

Referring to FIG. 8, the light source 91 and lens 92 are arranged at an angle of about 90°, to lens 93 and photocell 94, with capillary tube 79 at the apex of this angle. As bubble 81 changes position by the slightest movement, there will be a change in the ratio of scattered light to transmitted light, and the photocell 94 will, in this case, respond to the change in intensity of the scattered light.

Referring again to FIG. 5, when a portion of sample 77 is injected into column 73 of clamp 70, it will flow through channel 75 to the top of column 74, where it may overflow to provide the desired volume and pressure head above membrane 72. Solvent 80, contained in capillary 79 and channel 78, will tend to flow upward through semipermeable membrane 72, because of osmosis, and bubble 81 will begin to rise. Upon a microscopic upward movement of bubble 81, the change in the intensity of the scattered light will be detected by photocell 94, which will cause servomotor 90 to turn screw 89 in the proper direction for expanding bellows 87. This expansion of bellows 87 will reduce the liquid level in manometer arm 84, and thus reduce the hydrostatic pressure at the bottom of membrane 72. A pressure equilibrium between the hydrostatic pressure difference across the membrane and the osmotic pressure is quickly attained, and the upward flow of solvent through the membrane stops before any appreciable volume of fluid has passed through the membrane.

The two embodiments illustrated in FIGS. 1–8 have a sample-containing clamp with columnar holes acting as fill columns and overflow columns, samples being injected into one hole and overflowing at the other. To obtain a more precise control of the pressure head in the sample chamber above the membrane, the arrangement employed in a third embodiment, illustrated in FIGS. 9–12, is employed.

Referring now to FIG. 9, clamp 100 is provided with a cup 101, which has a stem extending through clamp 100 to the underside thereof, where it intersects and connects with one end of a serpentine channel 104. A flat cover 102 is placed over cup 101. This cover contains a hole 103 which allows atmospheric pressure to exist within cup 101, and allows overflow liquid to escape from it. A tube 105, connected to tubular extension 106 through outlet 107, has a stopcock 108. Tube 105 extends through clamp 100 to the undersurface thereof, and intersects the other end of channel 104 so as to communicate with cup 101 through channel 104 forming a continuous sample chamber. Extension 106 extends to a liquid container 109, and is used as a siphon to pull sample through serpentine channel 104. Preferably, channel 104 is about 10 to 50 mils deep.

The sample-containing clamp 100 is placed over semipermeable membrane 111, which is supported by membrane-supporting block 112 provided with a capillary tube 113 extending through the underside of the support block 112 and connecting to and communicating with the center of a serpentine channel 114 engraved into the supporting surface of support block 112. Channel 114 is in the order of 5 mils deep, and tube 113 being a small bore capillary tube, the amount of solvent in the measurement system is small; changes in volume caused by expansion or contraction of the solvent with temperature changes are therefore negligible.

When a sample is to be introduced into the sample-containing clamp 100, the following procedure is used. Cover 102 is removed, and cup 101 filled with solvent. Stopcock 108 is opened, and solvent is pulled through chamber 104, tube 105, outlet 107, extension tube 106, and into container 109. This pulling is started by the application of suction to the end of extension tube 106 (as by squeezing a rubber bulb). Once the flow begins, siphon action will force its continuance. Flow is stopped when cup 101 has been emptied of solvent; this is accomplished by closing stopcock 108. Chamber 104 is always kept full to prevent drying out of the membrane.

The sample is now introduced into cup 101, from a dropper, a pipette, or the like. Cover 102 is replaced, and stopcock 108 again opened to restart the flow. Flow is continued until a sufficient volume of sample has flowed from cup 101 to insure replacement of all the solvent in chamber 104 by sample. Stopcock 108 is then closed again, and the measurement of osmotic pressure is made.

The level of liquid sample in cup 101 is viewed through a conventional viewing lens to provide a convenient means of making accurate measurements of the pressure head in clamp 100. To set the liquid level at a precise value, additional fluid may be drawn out through stopcock 108 to bring the liquid level in cup 101 to precisely the desired height, as viewed in the viewing lens. The relatively large cross-section of cup 101 permits accurate setting of the liquid level by withdrawing easily controlled volumes of fluid. This large cross-section also reduces surface tension which may hinder accurate level setting. Once the level is set correctly, stopcock 108 is closed.

When the sample is to be removed, stopcock 108 may be opened and sample withdrawn through outlet tube 107 by suction. If the membrane is to be reused, solvent may be pulled from cup 101 into chamber 104 to keep the membrane wet after the sample has been removed.

If desired, means may be provided for conveniently flushing the solvent out of the solvent-containing membrane support block, as shown in FIGS. 11 and 12. This may be desirable, for example, when certain fractions of a sample pass through the membrane and contaminate the solvent. Block 112 is provided with serpentine channel 114 as hereinbefore described. The bore of capillary 113 opens into the center of channel 114 to form the solvent-containing chamber. Block 112 is also provided with recesses tapered to receive two tapered stopcocks 123 and 124. Holes 125 and 126 connect each end of serpentine channel 114 with solvent supply and exhaust tubes 127 and 128, respectively, through stopcocks 123 and 124. When a change in solvent is desired, stopcocks 123 and 124 are turned to the open position and solvent is introduced through tube 127, flowing out through tube 128 to flush out the solvent chamber, removing contaminated solvent from channel 114 and replenishing the solvent chamber with new solvent. Thus, a means is provided for speedy and convenient removal or restoration of both sample and solvent without the necessity of removing semipermeable membrane 111, and once a suitable membrane is selected, it may be reused for many tests without removal. This convenient removal system is particularly desirable when the sample contains molecules too small to be filtered by the membrane. These contaminate the solvent. It is therefore necessary to have an easy and convenient means of replacing the contaminated solvent with fresh solvent.

Again, it is to be noted that the serpentine channels 104 of clamp 100, as shown in FIG. 10, are placed down upon semipermeable membrane 111, which is supported by the supporting surface of block 112 containing serpentine channels 114, disposed approximately perpendicularly to channels 104 of clamp 100. This arrangement provides less direct communication between channels 104 and 114 of FIGS. 10 and 11 than is provided by the parallel arrangement of FIGS. 2 and 3. The channels in FIGS. 10 and 11 are clamped together in a face-to-face relationship with semipermeable membrane 111 between them. Sufficient area for solvent transportation across the membrane surface is provided, while at the same time sufficient area to support membrane 111 rigidly is also provided. The channel patterns intersect each other frequently at an average angle of 90°; because their intersecting angle is large, a certain amount of misalignment is allowable, and will not affect the operation of this osmometer.

Referring to FIGS. 11 and 12, groove 129 in block 112 has a very important purpose. This groove acts as a moat. The groove is supplied continuously with solvent from a solvent supply (not shown). This groove 129 does not communicate with serpentine channel 114. The membrane is placed over the entire block 112 including groove 129. The membrane forms a seal over the groove when clamp 100 is placed over the membrane. The solvent in groove 129 is used to replace any solvent evaporating from the edges of the membrane. As the solvent from groove 129 is consumed, it is continuously replaced from the solvent reservoir, thereby eliminating any spurious osmotic pressure readings which would otherwise result if the evaporated solvent were replaced by flow across the membrane.

Another feature shown in FIG. 9 is extremely helpful when membranes are to be changed. At the end of capillary 113 is a bubble trap 130, which is a portion of the capillary somewhat larger in volume than the bubble. When the membrane is changed, the bubble tends to drop; if not stopped, it may travel an appreciable distance from its normal reading position. After the new membrane has been installed, a considerable time may be wasted while the bubble rises to its reading position. The bubble can rise only as fluid diffuses through the membrane—this is a slow procedure.

Bubble trap 130 traps the bubble just below its reading position. Since the volume of the trap is larger than the bubble, fluid will flow through the trap as the membrane is changed, but the bubble will remain in the trap. When the new membrane is finally in place, only a brief time is required to bring the bubble the short distance from the trap 130 back to its reading position.

It should be understood that this invention in its broader aspects is not limited to specific examples illustrated and described herein and that the following claims are intended to cover all changes and modifications that do not depart from the true spirit and scope of this invention.

What is claimed is:
1. A membrane osmometer comprising:
(a) a support having a generally flat upper surface adapted to support a membrane over said upper surface, said support having a channel inscribed in its upper surface defining a solvent chamber;
(b) a clamp having a generally flat lower surface adapted to press down upon the membrane supported upon said support, said clamp having inscribed in its lower surface a continuous channel defining a sample chamber;
(c) means for pressing said clamp and said support together for holding the membrane tightly between them; and
(d) means for providing an adjustable hydrostatic pressure difference between the sample chamber defined by said clamp and the solvent chamber defined by said support.

2. A membrane osmometer comprising:
 (a) a support having a generally flat upper surface adapted to support a membrane over said upper surface, said support having a channel inscribed in its upper surface defining a solvent chamber;
 (b) a clamp having a generally flat lower surface adapted to press down upon the membrane supported upon said support, said clamp having inscribed in its lower surface a continuous channel defining a sample chamber;
 (c) means for pressing said clamp and said support together for holding the membrane tightly between them;
 (d) a capillary tube attached to said support in communication with the solvent chamber; and
 (e) means for applying a variable pressure through said capillary tube to the solvent chamber; and
 (f) means responsive to fluid movement within said capillary tube for automatically adjusting said variable pressure to stop the flow of solvent in the capillary tube, whereby the osmotic pressure is automatically balanced by a change in the variable pressure.

3. An osmometer comprising:
 (a) a sample-containing clamp having a fill column and an overflow column, both extending through and to the undersurface of said clamp to a first continuous channel pattern in said undersurface, said first channel pattern connecting said fill column and said overflow column to form a continuous sample chamber;
 (b) a solvent chamber block having a support surface and a second channel pattern in said support surface;
 (c) a capillary tube extending through the underside of said supporting block and in communication with the channel pattern therein, said capillary tube containing solvent and a bubble, and said block and capillary tube forming a solvent chamber;
 (d) means securing said sample-containing clamp and said solvent chamber block tightly together for holding a semipermeable membrane therebetween;
 (e) flow-detecting means arranged for detecting the flow of solvent in said capillary tube; and
 (f) pressure-supply means responsive to said flow-detecting means for applying sufficient pressure to balance the osmotic pressure.

4. The combination defined in claim 3, wherein the flow-detecting means comprises:
 (a) a source of light;
 (b) a lens system arranged to project a narrow beam of light through the meniscus of the bubble contained in said capillary tube; and
 (c) a photocell arranged to receive light transmitted through said tube.

5. A combination defined in claim 3, wherein the pressure-supply means comprises:
 (a) an open-end tube;
 (b) means for connecting said open-end tube to said capillary tube; and
 (c) means for elevating or depressing said open end tube responsive to said flow-detecting means.

6. A combination defined in claim 3, wherein the pressure-supply means comprises:
 (a) an open-end tube with one end connected to and in communication with said capillary tube;
 (b) a bellow connected to and in communication with said open-end tube and said capillary tube; and
 (c) means for expanding and contracting said bellows, said means being responsive to said flow-detecting means.

7. The combination defined in claim 3 additionally comprising:

(a) a relatively massive, solid member provided with recesses for containing the clamp, the block, and the flow-detecting means, the recess receiving the block being provided with internal threads;
 (b) means for heating said massive member;
 (c) means for thermostatically controlling the temperature of said massive member;
 (d) a resilient gasket fitting over said block;
 (e) an externally threaded ring fitting over said resilient gasket and engaging the internal threads of the recess receiving the block, whereby the block is held in place within said recess;
 (f) a plurality of pins extending from the top of said massive member;
 (g) a washer fitting over the clamp, said washer being provided with a central hole to allow insertion of samples, said washer being provided with other holes receiving said pins to prevent the rotation of said washer upon said massive member;
 (h) a screw cap fitting onto said massive member and over said washer for holding the washer in place, said cap being provided with a central hole to allow insertion of samples, and being provided with other holes that are threaded; and
 (i) a plurality of bolts extending through the threaded holes in said cap and abutting on said washer.

8. An osmometer comprising:
 (a) a membrane support having a generally flat upper surface adapted to support a membrane over its bottom surface, said support having a channel pattern inscribed in its upper surface defining a solvent chamber;
 (b) a membrane clamp having a generally flat lower surface adapted to press down upon the membrane supported upon said support, said clamp having inscribed in its lower surface a continuous serpentine channel defining the sample chamber;
 (c) means securing said clamp and said block tightly together with the semipermeable membrane between them;
 (d) a capillary tube extending through said support to the membrane supporting surface thereof, said capillary tube being in communication with the channel pattern in said support and therewith defining a solvent chamber for containing solvent and a bubble, the bubble moving within the capillary tube responsive to the flow of solvent through the membrane responsive to osmotic pressure;
 (e) a vertically movable open tube adapted to contain liquid;
 (f) flexible connecting means between said open tube and said capillary tube;
 (g) means for detecting movement of the bubble in said capillary tube; and
 (h) means responsive to said detecting means for automatically adjusting the position of said vertically movable open tube, thereby adjusting the height of the liquid surface therein and the pressure supplied thereby to oppose and stop movement of the bubble.

9. An osmometer comprising:
 (a) membrane support having a generally flat upper surface adapted to support a membrane over its bottom surface, said support having a channel inscribed in its upper surface defining a solvent chamber;
 (b) a membrane clamp having a generally flat lower surface adapted to press down upon the membrane supported upon said support; said clamp having inscribed in its lower surface a continuous serpentine channel defining the sample chamber;
 (c) means for pressing said clamp and said support together for holding the membrane tightly between them;
 (d) a capillary tube extending through said support to the membrane support surface thereof, said capillary tube containing solvent;

(e) means for detecting the flow of solvent in said capillary tube;
(f) an open tube connected to and in communication with said capillary tube;
(g) a bellows connected to and in communication with said capillary tube and said open tube; and
(h) means responsive to said flow-detecting means for expanding or compression said bellows, thereby varying the liquid level in said open tube for balancing the osmotic pressure.

10. An osmometer comprising:
(a) a support having a generally flat upper surface adapted to support a membrane over said upper surface, said support having a channel inscribed in its upper surface defining a solvent chamber, and having a groove around its periphery separate from said solvent chamber, capable of containing additional solvent;
(b) a clamp having a generally flat lower surface adapted to press down upon the membrane supported upon said support, said clamp having inscribed in its lower surface a channel defining a sample chamber;
(c) means for pressing said clamp and said support together for holding the membrane tightly between them and over said groove; and
(d) means for providing an adjustable hydrostatic pressure difference between the sample chamber defined by said clamp and the solvent chamber defined by said support.

References Cited by the Examiner

UNITED STATES PATENTS

| | | | |
|---|---|---|---|
| 2,389,508 | 11/45 | Hejduk | 73—401 |
| 2,684,593 | 7/54 | Rothstein | 73—401 |
| 2,716,886 | 9/55 | Rowe | 73—53 |
| 2,818,726 | 1/58 | Amonette et al. | |
| 3,063,288 | 11/62 | Reiff | 73—53 |

FOREIGN PATENTS

| | | |
|---|---|---|
| 669,342 | 12/38 | Germany. |
| 956,360 | 1/57 | Germany. |

LOUIS R. PRINCE, *Primary Examiner.*

DAVID SCHONBERG, RICHARD QUEISSER,
*Examiners.*